US006836274B1

(12) United States Patent
Kikinis

(10) Patent No.: US 6,836,274 B1
(45) Date of Patent: Dec. 28, 2004

(54) THREE DIMENSIONAL LIGHT ELECTRONIC PROGRAMMING GUIDE

(75) Inventor: Dan Kikinis, Saratoga, CA (US)

(73) Assignee: Eagle New Media Investments, LLC, Chicago, IL (US)

( * ) Notice: Subject to any disclaimer, the term of this patent is extended or adjusted under 35 U.S.C. 154(b) by 0 days.

(21) Appl. No.: 09/665,367

(22) Filed: Sep. 19, 2000

Related U.S. Application Data

(60) Provisional application No. 60/203,128, filed on May 8, 2000.

(51) Int. Cl.[7] .............................................. G06F 15/00
(52) U.S. Cl. ...................................... 345/716; 345/679
(58) Field of Search ................................ 345/716, 769, 345/765, 733, 848, 419, 721; 725/4, 10, 48, 40, 49, 46; 348/155

(56) References Cited

U.S. PATENT DOCUMENTS

| | | | |
|---|---|---|---|
| 4,621,259 A | 11/1986 | Schepers et al. ............ 345/180 |
| 5,243,418 A | 9/1993 | Kuno et al. ................. 348/155 |
| 5,414,773 A | 5/1995 | Handelman | |
| 5,479,268 A | 12/1995 | Young et al. | |
| 5,485,197 A | * 1/1996 | Hoarty .......................... 348/7 |
| 5,532,754 A | 7/1996 | Young et al. | |
| 5,550,576 A | 8/1996 | Klosterman .................. 725/46 |
| 5,684,525 A | 11/1997 | Klosterman .................. 725/48 |
| 5,704,837 A | 1/1998 | Iwasaki et al. ............... 463/38 |
| 5,724,492 A | * 3/1998 | Matthews, III et al. ..... 345/419 |
| 5,737,028 A | 4/1998 | Bertram et al. | |
| 5,751,282 A | 5/1998 | Girard et al. | |
| 5,808,613 A | 9/1998 | Marrin et al. ............... 345/850 |
| 5,818,441 A | 10/1998 | Throckmorton et al. | |
| 5,828,945 A | 10/1998 | Klosterman .................. 455/42 |
| 5,841,563 A | 11/1998 | Effenberger | |
| 5,900,915 A | 5/1999 | Morrison | |
| 5,923,362 A | 7/1999 | Klosterman .................. 725/48 |
| 5,926,168 A | 7/1999 | Fan | |
| 5,929,849 A | 7/1999 | Kikinis ....................... 725/113 |
| 5,940,073 A | 8/1999 | Klosterman et al. ........ 345/721 |
| 5,956,456 A | 9/1999 | Bang et al. | |
| 5,977,964 A | * 11/1999 | Williams et al. ............ 345/716 |
| 5,999,167 A | 12/1999 | Marsh et al. | |
| 5,999,187 A | 12/1999 | Dehmlow et al. .......... 345/420 |
| 6,002,403 A | 12/1999 | Sugiyama et al. .......... 345/717 |
| 6,029,195 A | 2/2000 | Herz | |
| 6,043,818 A | * 3/2000 | Nakano et al. ............. 345/848 |
| 6,061,055 A | 5/2000 | Marks ........................ 382/276 |
| 6,072,983 A | 6/2000 | Klosterman .................. 725/49 |
| 6,075,575 A | 6/2000 | Schein et al. | |
| 6,078,348 A | 6/2000 | Klosterman et al. .......... 725/40 |
| 6,081,271 A | 6/2000 | Bardon et al. .............. 345/419 |
| 6,167,188 A | 12/2000 | Young et al. | |
| 6,205,485 B1 | 3/2001 | Kikinis | |
| 6,233,389 B1 | 5/2001 | Barton et al. | |
| 6,243,039 B1 | 6/2001 | Elliot ......................... 345/457 |
| 6,271,831 B1 | 8/2001 | Escobosa et al. | |

FOREIGN PATENT DOCUMENTS

| | | | |
|---|---|---|---|
| JP | 410093880 A | 4/1998 |
| WO | WO 00/01149 A1 | 1/2000 |

* cited by examiner

*Primary Examiner*—Cao (Kevin) Nguyen
(74) *Attorney, Agent, or Firm*—Robert J. Depke; Holland & Knight LLP

(57) ABSTRACT

A method and apparatus of displaying an Electronic Programming Guide (EPG). In one embodiment, an EPG is displayed in a three dimensional virtual mesh, in which independent objects representing television programs are situated. The simplified nature of the three dimensional EPG reduces the amount of processing necessary to display it. In addition, the virtual mesh may be displayed isometrically, so that hardware requirements are further reduced and it may be possible to use a software only three dimensional graphics pipeline. If a user has a set top box (STB) with a hardware accelerated graphics pipeline, the EPG may be displayed in a full three dimensional perspective view. A user can navigate the mesh to find television programs that they wish to view. A user can assign values to types of television programs that they prefer, and these programs will be displayed more prominently.

44 Claims, 6 Drawing Sheets

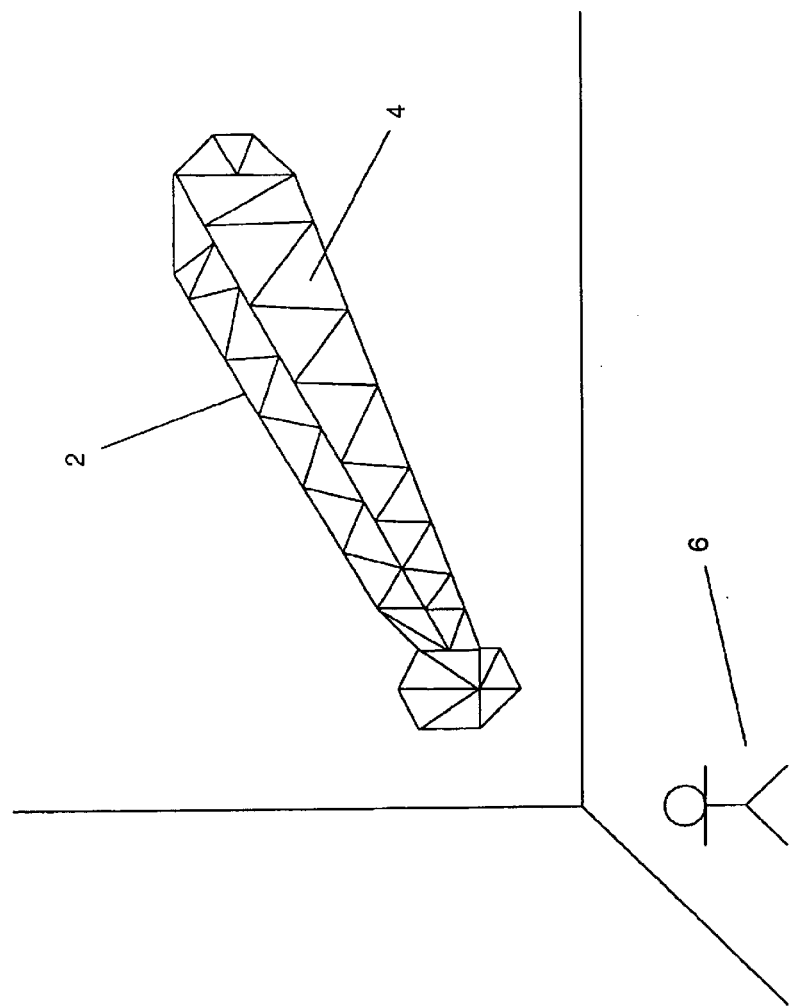

Isometric View

Perspective View

| Category | |
|---|---|
| SPORTS | 1 |
| SITCOMS | 2 |
| TRAVEL | 2 |
| LATE NIGHT | 3 |
| NEWS | 1 |

200

THREE DIMENSIONAL LIGHT ELECTRONIC PROGRAMMING GUIDE

This application claims priority under 35 U.S.C. §119(e) from provisional patent application, entitled "Three Dimensional EPG", Ser. No. 60/203,128 filed on May 8, 2000.

FIELD OF THE INVENTION

In The invention relates to the field of creating electronic programming guides (EPGs) for television viewing. More specifically, the invention relates to providing a three dimensional EPC.

BACKGROUND OF THE INVENTION

Electronic Programming Guides (EPGs) allow a viewer to receive information about programs being shown on their cable television system. Currently available EPGs typically display program information, such as which programs are on what channels, and when those programs will be shown. Typically, because there is more information than can be displayed on the television at once, these EPGs scroll past the screen at a specified rate, making navigation frustrating. These EPGs are usually displayed on one channel of a cable television system and do not allow for interactivity.

Newer digital EPGs allow a user to interact using their remote control or other means. These EPGs allow users to scan the program selections and seek out programs which they want to view, and do allow some interaction by the user. However, they are still quite simple, and generally not very attractive.

Digital EPGs also typically require a set top box (STB) to be attached to a user's television. The STB contains hardware and software necessary to process the EPG and the user's input, and also to descramble certain cable channels.

Most EPGs have been simple two-dimensional (2D) text-oriented Electronic Programming Guides. They typically display only one text size and very limited graphics. In general the use of graphics is mostly limited to character-based graphics, capable of drawing boxes, outlines, fields, etc. What is needed is a more interactive and dynamic EPG that can be used on the current generation of STBs.

SUMMARY OF THE INVENTION

The present invention provides a method and an apparatus for displaying an Electronic Programming Guide (EPG) having a reduced graphics hardware requirement and capable of three-dimensional graphics. In one embodiment the method includes displaying a virtual mesh comprising independent objects situated in a set of parallel planes. The mesh can be displayed in a full three dimensional perspective view. In an alternative embodiment, hardware requirements may be further reduced if a three dimensional isometric view is utilized. The user can then navigate the mesh, and programs can be positioned in the mesh based on predetermined criteria.

BRIEF DESCRIPTION OF THE DRAWINGS

The present invention is illustrated by way of example and not limitation in the figures of the accompanying drawings, in which:

FIG. 1a illustrates a three dimensional object as generated by a three dimensional graphics pipeline;

DETAILED DESCRIPTION

Figure 1D:
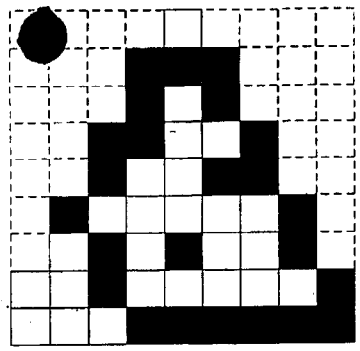
FIG. 1d illustrates a pixel array bound to a trapezoid.
Figure 1D:

One embodiment provides a method and apparatus for displaying an Electronic Programming Guide (EPG) with a reduced hardware requirement. In the following description, for purposes of explanation, specific details are set forth to provide a thorough understanding of the present invention. However, it will be apparent to one skilled in the art that these specific details are not required in order to practice the present invention.

Commonly assigned U.S. patent application Ser. No. 09/488,361, filed Jan. 16, 2000, introduced a three-dimensional (3D) EPG which allows for a much more configurable and user friendly interface than previous two dimensional (2D) EPGs.

The invention describe herein is sometimes referred to as 3D EPG "Light." The arrangement and method of displaying the EPG will reduce the hardware requirements of the STB, to further allow current STBs to display the described EPG.

Three Dimensional Graphics Pipeline

In order to display a 3D EPG, a STB typically requires a 3D graphics pipeline. Either a hardware-accelerated 3D graphics pipeline or a software-only 3D graphics pipeline may be used. A hardware-accelerated 3D graphics pipeline has the advantage of faster processing because it has dedicated hardware that handles calculations that would otherwise be performed by the central processing unit (CPU). A software-only pipeline is typically slower than a hardware-accelerated pipeline because the CPU must handle graphics processing. However, a software pipeline does not require dedicated 3D graphics hardware, and thus is less expensive and can easily be adapted to currently available STBs that do not already have 3D hardware acceleration.

The following is meant to be a short description of a 3D graphics pipeline. The commonly assigned U.S. patent application Ser. No. 09/488,361, describes 3D accelerator technology in more detail, and is incorporated herein by reference.

FIG. 1a illustrates the construction of a 3D object using a 3D pipeline. A 3D graphics pipeline, either hardware or software, operates as a subsystem of a larger computer system that may be part of, for example, a STB. A 3D graphics pipeline creates a 3D object by first receiving data describing the object from the larger system. The data includes coordinates describing a geometric surface, and pixel arrays. A geometric surface 2 is created from polygons 4. For example, in FIG. 1a, a baseball bat is constructed from triangles.

A pixel array is in essence a graphic image displayed on a computer system. After the geometric surface is created, the pixel array is bound to the surface. By binding the array to the geometric surface, the 3D pipeline effectively covers the surface with the array. For example, the array corresponding to the object in FIG. 1a would contain a bitmapped image resembling wood. The array would then be bound to the geometric surface, and it would resemble a baseball bat.

Once the image is bound, the 3D pipeline displays the image from a reference point 6. Reference point 6 is the point from where a viewer sees the object. Reference point 6 can be moved to give different views of the object.

Figure 1C:
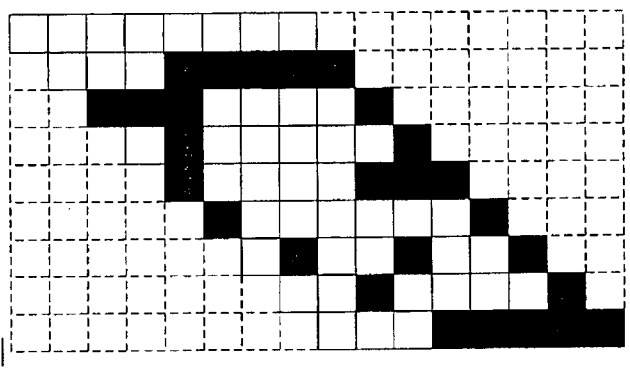
FIG. 1c illustrates a pixel array bound to a parallelogram.
Figure 1C:
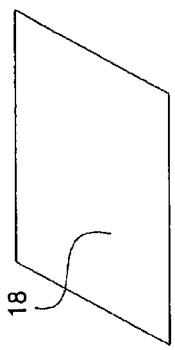
Figure 1B:
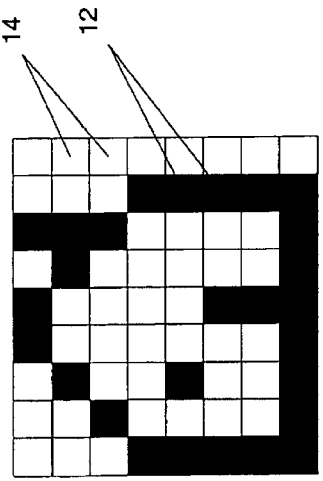
FIG. 1b illustrates a pixel array.

FIG. 1b is an example of a pixel array. A pixel is essentially a point of light on a display. A display is made up of a grid of pixels, each representing a specific color. The pixels are arranged to create an image on the display. Pixel arrays are image files that are typically rectangular in shape and defined by the number of pixels long by the number of pixels wide. Pixel array 10 is a grid of 9×9 pixels. In pixel array 10, there are two colors, black pixels 12 and white pixels 14. Pixel array 10 resembles a house.

As an example, consider that there is a simple geometric surface consisting of a single polygon, a square. A graphics pipeline could bind pixel array 10 to the square. If the square were the same size as the pixel array, the pixel array could be bound to the square by simply placing the pixels within the square. This operation requires minimal processing. Were the square larger or smaller than the pixel array, the pipeline would have to add or remove pixels, or "resize" the pixel array, to approximate the size of the square. Resizing a pixel array still requires only a small amount of processing.

Now, consider binding the pixel array to a rhomboid, such as rhomboid 18 in FIG. 1c. If the lines of the rhomboid had the same dimensions as the pixel array, you could bit shift the pixel array. Rhomboidal pixel array 20 is an example of a bit shift of pixel array 10. In rhomboidal pixel array 20, the leftmost column of pixels remains in its place, and the column to the right is shifted up one or more pixels. Each successive column to the right is shifted a certain number of pixels until the rightmost column has been moved. As bitshifting only requires rearrangement of pixels, it too is a relatively minor burden on a graphics subsystem.

If you wanted to bind the pixel array to a trapezoid, such as trapezoid 28 in FIG. 1d, you might need to compress some areas of the array, while you might need to expand others. A pixel array is compressed when certain pixels are removed to make the image smaller, and is expanded when pixels are added to make the image larger. As a result, different areas of the image may be compressed or expanded at different rates. Trapezoidal pixel array 30 is an example of binding pixel array 10 to a trapezoid. This type of operation requires a greater amount of processing than either resizing or bitshifting, and can become burdensome on a system that does not have a hardware accelerated graphics pipeline.

Figure 1F:
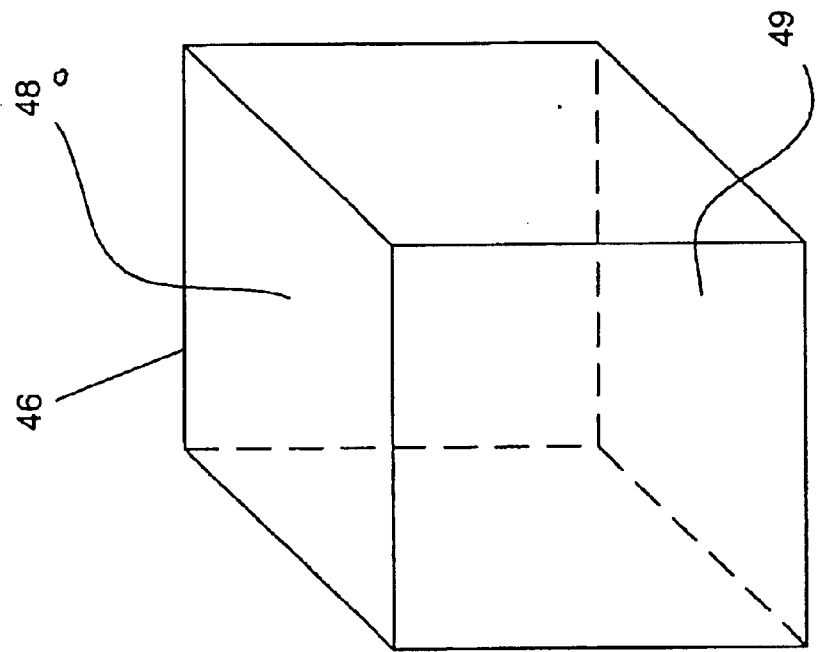
FIG. 1f illustrates a three dimensional object with an isometric view.
Figure 1E:
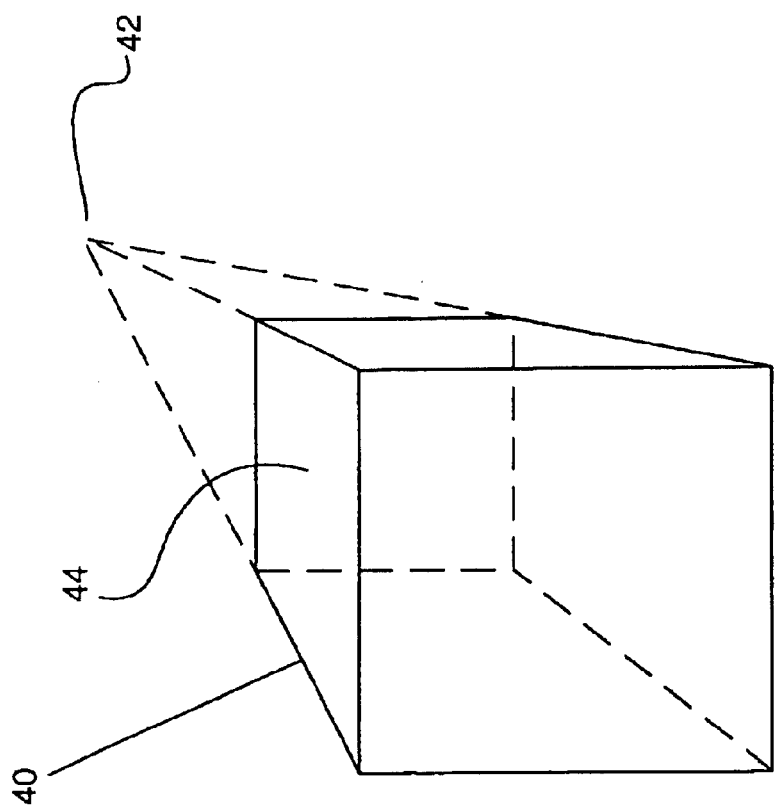
FIG. 1e illustrates a three dimensional object with a perspective view.

FIG. 1e is an example of a three dimensional object with a perspective view. When displayed with a perspective view, the lines of a 3D object such as perspective cube 40 will appear to converge upon a vanishing point 42. A perspective view requires processing in addition to the processing necessary to create a 3D object. This is because many of the surfaces of an object with a perspective view, such as top 44, will be trapezoidal. As explained above, when binding a rectangular pixel array to a trapezoidal surface, extensive processing will be required. Additionally, many of the surfaces in a perspective view will also need to be bitshifted, which further increases the necessary amount of processing.

FIG. 1f is an example of a three dimensional object with an isometric view. With an isometric view, a 3D object such as isometric cube 46 appears uniform, and does not seem to disappear at a vanishing point. In other words, parallel lines will always look parallel with an isometric view, while in a perspective view they will appear to converge.

Some rectangular surfaces in an isometric view become rhomboids, such as top 48. As explained above in FIG. 1d, binding a pixel array to a rhomboid requires only that a 3D graphics pipeline bitshifts the pixels, a relatively undemanding process. Thus, an EPG that has an isometric view will provide more acceptable performance with a software pipeline. As a result, a software pipeline may be desirable because it can be easily adapted to current set top boxes.

Simplified Three Dimensional Electronic Programming Guide

Figure 2:
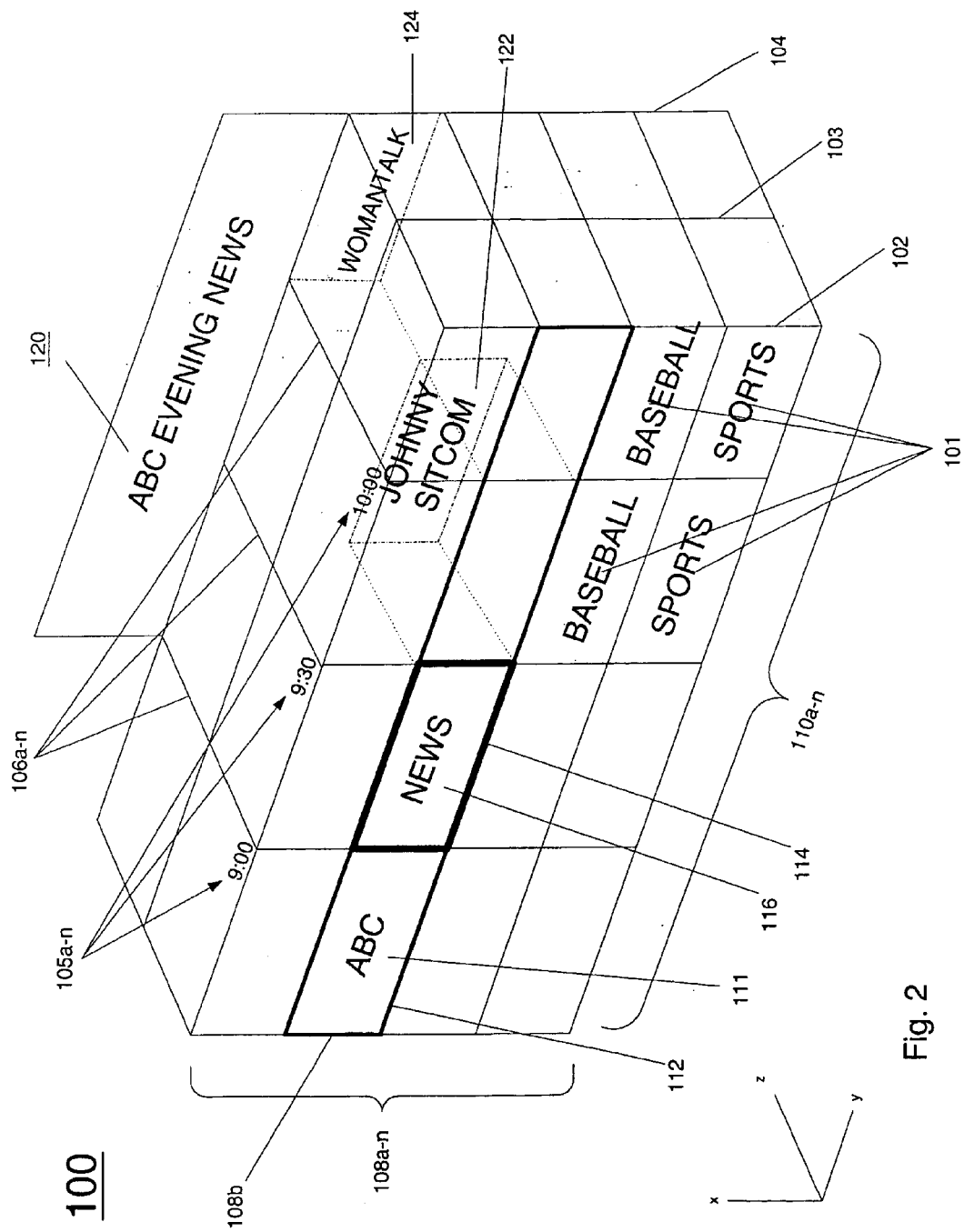
FIG. 2 illustrates an isometric three-dimensional Electronic Programming Guide (EPG) according to one embodiment.

FIG. 2 illustrates an exemplary EPG according to one embodiment. As shown the EPG includes virtual mesh 100 for displaying television programming information. A user may navigate through virtual mesh 100 to find desired television programs.

Virtual mesh 100 is a polyhedron. A polyhedron is a three dimensional object, such as a cube or a pyramid, that is essentially a solid bounded by polygons. Virtual mesh 100 is also a geometric object (see e.g., FIG. 1a, element 2) constructed from independent objects 101, and three planes 102–104. There are relatively few elements to process in virtual mesh 100 when compared to a typical geometric object.

A geometric object, such as geometric surface 2, generally comprises many polygons 4 in order to create a smooth, realistic looking surface. In addition, with a typical scene displayed by a hardware accelerated 3D graphics pipeline contains many geometric objects which all require a significant amount of processing. Even a few geometric objects may comprise several hundred polygons which all require binding bitmap images to their surfaces.

In contrast to most geometric objects, the EPG described below comprises only dozens of surfaces that are mostly stationary. Compared to the typical application which requires a 3D graphics pipeline, the number of elements of the here enumerated EPG is quite small. The simplicity of this EPG is one factor that reduces the amount of processing required by the EPG, and allows it to be implemented on current set top boxes (STBs).

Virtual mesh 100 can be displayed either with an isometric view or in a full 3D perspective view. As explained above, if virtual mesh 100 is displayed in a perspective view, a hardware-accelerated 3-D pipeline may be required. Displaying virtual mesh 100 with an isometric view may allow the implementation of the EPG on an STB exclusive of a hardware accelerated 3D graphics pipeline. One advantage of the current invention is that new set top boxes may not be required, which may allow this new EPG to be brought to market more quickly and less expensively.

Virtual mesh 100 is constructed of individual mesh lines, which give the mesh its shape and its structure. As shown in FIG. 2, virtual mesh 100 has the shape of a cube, but it is clear that virtual mesh 100 may also be in the shape of other polyhedrons. The mesh lines are arranged as to create a set of columns and rows, in which television programming information can be displayed.

As shown in FIG. 2, virtual mesh 100 is a group of lines displayed on a video screen configured so that objects 101 may be displayed within the mesh. In one embodiment, objects 101 represent individual television programs. Independent objects 101 are arranged as to make navigation of the mesh simple, and to bring to the user's attention those programs in which they may be interested.

Virtual mesh 100 is further a virtual 3-D view of three parallel planes 102, 103 and 104 housing at least one independent object 101 positioned in virtual mesh 100. Virtual mesh 100 is further aligned along three axes, the x-axis, the y-axis and the z-axis. As shown in FIG. 2, planes 102, 103, and 104 are aligned along the z-axis.

In one embodiment, planes 102–104 are rectangular and parallel. The first plane 102 creates the face of mesh 100, the second plane 103 bisects mesh 100, and the third plane 104 creates the backing of mesh 100. The three planes house objects 101 so as to give the appearance of a table of television listings.

Each plane may have its own color and form. For example, plane 102 can be assigned the color red, and thus its mesh lines are red. Plane 103 can be assigned the color blue, and thus its mesh lines are blue, and plane 104 can be assigned the color green, which means its mesh lines are green.

In one embodiment, objects 101 are not a part of virtual mesh 100; they are merely situated within the mesh 100. Each of the program elements 101 is a fully independent object that may be manipulated by the EPG independent of virtual mesh 100. Objects 101 further comprise one or more interactive surfaces. Interactive surfaces may be acted upon by the user to create a desired result, such as selecting a new channel.

Objects 101 may be arranged in planes 102, 103, 104 according to user selected categories. In one embodiment, the three planes shown represent levels of preference, and specifically represent the categories "preferred," "neutral," and "don't prefer." However, any alternative number of categories greater than one could be used. In FIG. 2, the first plane 102 represents the "preferred" category, the second plane 103 represents the "neutral" category and the third plane 104 represents the "don't prefer" category.

Although one embodiment shows planes 102, 103 and 104 that are parallel with a rectangular shape, and objects 101 that are rectangular, in other embodiments the program listings could be displayed in various different forms. An object 101 could be a pictogram that graphically displays the type of programming represented by that object. For example, the program listing of a baseball game could appear in a virtual 3-D shape of a baseball bat, or a baseball (not shown). Additionally, the planes need not be parallel and aligned along the z-axis. Any variety of shapes, sizes, and alignments of listings and listing planes could be created within the scope of the invention.

The top plane of virtual mesh 100, formed by the x and y axes of the three planes is a Time Plane. It has time numerals 105 a through n, the first two of which are shown as "9:00" and "9:30". Time lines 106a through 106n extend along the z axis from front to back, as seen in FIG. 2, across planes 102, 103, and 104. The numbers and the time lines may also be a distinctive color, such as, for example, yellow or gold.

Mesh rows 108a through 108n represent channels, and columns 110a through 110n represent times. Names identifying channels are listed in the first column 110a. The rows corresponding to a specific channel listed in column 110a further list the programs on that channel at different times. For example, row 108b contains listings for the channel "ABC" 111.

Virtual mesh 100 can contain all available channels from a service provider or can contain a subset of channels selected by interest group or by certain other criteria. The selection criteria may be either user-selectable or preselected by the provider.

A user may navigate the mesh using a remote control device attached to a set-top box (not shown). A user navigates mesh 100 by moving a cursor or highlight bar throughout the mesh. For example, in FIG. 2, row 108b is highlighted by highlight bar 112, which indicates to the user that they have currently selected that channel. In FIG. 2, the selected channel is ABC 111. Because row 108b is highlighted, a semi-transparent colored band extends from the front row to the back to indicate the location of the elements.

The cursor 114 is currently highlighting element 116, which is an object that represents the user's currently selected program, the news. In one embodiment, because the news 116 is currently selected, the full title of the program "ABC Evening News" is displayed on sign 120. Sign 120 is placed on top of the mesh and displays details of the selected program. The user may move cursor 114 throughout the mesh 100 to select and preview different television programs. In addition to showing the selected element on table 120, a further enhancement in one embodiment could pull that show to the front and display it hovering in front of the mesh 100.

In the example illustration of FIG. 2, the news 114 is in the first plane 102 because the user has designated newscasts as a preferred television program. Based on selected interest categories, the programs matching certain criteria are displayed in the first plane 102, indicating shows of the highest interest, the second plane 103 indicating shows of neutral interest, or displayed in the third plane 104, indicating shows of the lowest interest. Although planes 102, 103, and 104 are described above as representing level of interest, it is clear than a variety of criterias may be used to determine which programs are listed in which planes.

Furthermore, in the example shown in FIG. 2, Johnny Sitcom 122 is set back into the second plane 103, "neutral," because the user has given sitcoms a "neutral" preference setting. Womantalk 124 is set back into the third plane 104, or "not preferred."

The user views virtual mesh 100 from the front. Program listings in the front plane 102 appear to be at the front of the screen. Program listings in the middle plane 103 appear to be set back from the front of the screen, and program listings in the back plane 104 appear to be set further back than program listings in plane 103. In one embodiment, the programs that the user wishes to view are displayed more prominently, so that the user's attention will be immediately drawn to them. This increases the ease of use of the EPG and creates an attractive visual effect.

Although this example of one embodiment shows three planes, the EPG may contain any number of planes, such as only two, representing interested and not interested, or four or five planes, for varying levels of interest. In yet another embodiment, multiple users on the same set-top box may have different preferential profiles and may accordingly assign different categories to different preference levels.

The reduced number of elements that comprise the above described EPG helps to reduce the hardware requirements. Compared to most geometric objects processed by 3D pipelines, virtual mesh 100 and independent objects 101 are quite simple, and therefore will not require a great deal of processing to display. Additionally, the number of objects that comprise the EPG is also comparatively few, and thus there is less processing required.

Figures 3, 4:
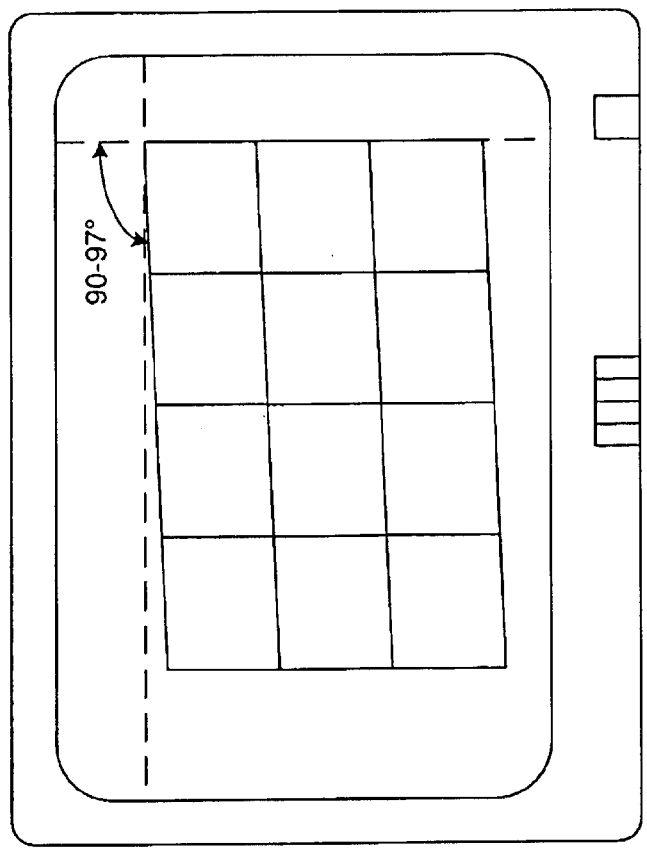
FIG. 3 illustrates a category list according to one embodiment.
FIG. 4 illustrates the position of an EPG relative to a television screen according to one embodiment.

FIG. 3 illustrates an example of a category list where all categories of the various available programs are shown. List 200 has two columns. Column 201 lists categories and column 202 shows the interest level assignment of each category. Either a user-selectable or preassigned value is assigned to each category. These values are then used by the system to tie the shows falling into each category to the correct planes 102 through 104.

In FIG. 3, for example, sports programs are given an interest level 1, and would therefore be in the first plane 102. Likewise, sitcoms are assigned interest level 2, and would be set in the second plane 103. And, late night shows are given interest level 3, and would be set in the third plane, 104.

Multiple customized tables can be programmed for different users, so when a user identifies himself, the EPG rearranges shows within the mesh accordingly. By pushing back certain shows and also making their entries visibly smaller than those in the foreground, shows of lesser interest are de-emphasized.

FIG. 4 shows virtual mesh 100 as seen on a television screen. In one embodiment, the angle between the top line and the perpendicular, as viewed on a 2-D screen, is between 90 and 97 degrees. The embodiment shown in FIG. 4 is exemplary. Other arrangements may be chosen without affecting the functionality of the EPG.

Figure 5:
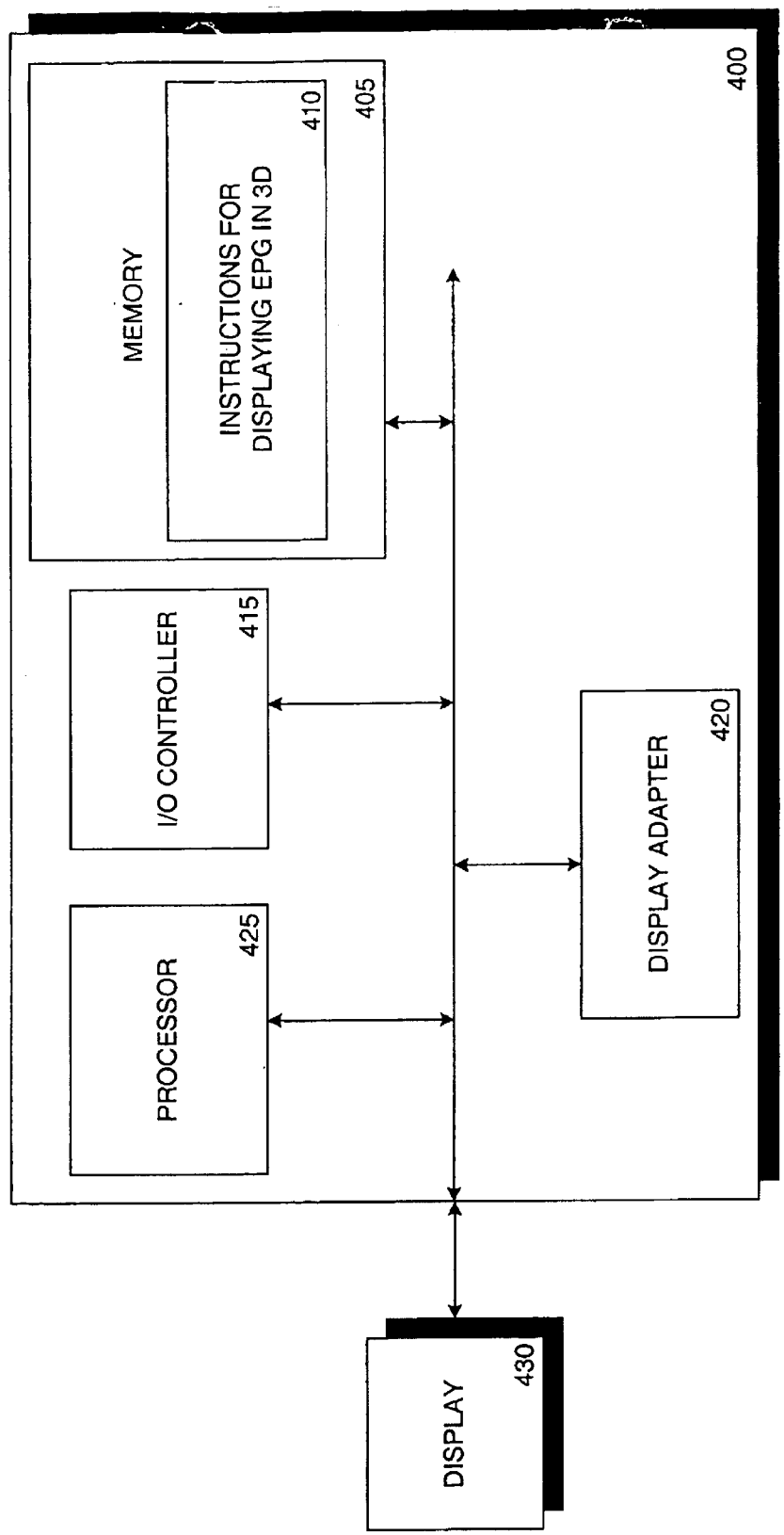
FIG. 5 illustrates a system having a readable medium with instructions stored thereon according to one embodiment.

The method of displaying an EPG in three dimensions, as described above, can be stored in the memory of a computer system (e.g., set top box, video recorders, etc.) as a set of instructions to be executed, as shown by way of example in FIG. 5. In addition, the instructions to display an EPG in three dimensions as described above could alternatively be stored on other forms of machine-readable medium, including magnetic and optical disks. For example, the method of the present invention could be stored on machine-readable mediums, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable mediums, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

The embodiments above have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the embodiments as claimed. Accordingly, the scope is defined by the appended claims rather than the forgoing descriptions of embodiments.

What is claimed is:

1. A method for displaying an Electronic Programming Guide (EPG) comprising:
    generating a three dimensional virtual mesh polyhedron wherein the virtual mesh polyhedron is displayed at an angle other than normal view;
    generating a plurality of planes positioned in said polyhedron, said planes being approximately parallel, said polyhedron having a first object on a first plane and a second object on a second plane, said objects providing interactive surfaces; and
    further wherein said plurality of planes are both internal and external plane surfaces which are used to display information.

2. The method of claim 1, wherein said EPG is generated exclusive of three dimensional graphics circuitry.

3. The method of claim 1, wherein selection of one of said objects will select a program provided on a certain channel at a certain time.

4. The method of claim 1, wherein said objects are independent of said polyhedron.

5. The method of claim 1, wherein said objects represent certain television program on a certain channel at a certain time.

6. The method of claim 1, wherein said polyhedron is a cube.

7. The method of claim 6, wherein said cube further comprises three axes.

8. The method of claim 7, wherein said axes correspond to time, channel, and user preference.

9. The method of claim 1, wherein said surfaces are stationary.

10. The method of claim 1, wherein said planes correspond to levels of preference.

11. The method of claim 1, wherein one of said objects a pictogram.

12. An Electronic Program Guide (EPG) comprising:
    a three dimensional virtual mesh polyhedron comprising a plurality of planes, said planes being approximately parallel wherein the virtual mesh polyhedron is displayed at an angle other than normal view;
    said polyhedron having a first object on a first plane and a second object on a second plane, and said objects providing interactive surfaces; and further wherein said plurality of planes comprise both internal and external plane surfaces which are used to display information.

13. The EPG of claim 12, wherein said EPG is displayed exclusive of three dimensional graphics circuitry.

14. The EPG of claim 12, wherein the selection of one of said objects will select a program provided on a certain channel at a certain time.

15. The EPG of claim 12, wherein said objects are independent of said polyhedron.

16. The EPG of claim 12, wherein said objects represent a certain television program on a certain channel at a certain time.

17. The EPG of claim 12, wherein said polyhedron is a cube.

18. The EPG of claim 17, wherein said cube further comprises three axes.

19. The EPG of claim 18, wherein said axes correspond to time, channel, and user preference.

20. The EPG of claim 12, wherein said surfaces are stationary.

21. The EPG of claim 12, wherein said planes correspond to levels of preference.

22. The EPG of claim 12, wherein one of said objects is a pictogram.

23. A system for displaying an Electronic Program Guide (EPG) comprising:
    a memory; and
    a first unit to generate a three dimensional virtual polyhedron wherein the virtual mesh polyhedron is displayed at an angle other than normal view;
    said first unit to further display a plurality of planes positioned in said polyhedron, said planes being approximately parallel, said polyhedron having a first object on a first plane and a second object on a second plane, and said objects providing interactive surface; and further wherein said plurality of planes comprise both internal and external plane surfaces which are used to display information.

24. The system of claim 23, wherein said EPG is displayed exclusive of three dimensional graphics circuitry.

25. The system of claim 23 wherein the selection of one of said objects will select a program provided on a certain channel at a certain time.

26. The system of claim 23, wherein said objects are independent of said polyhedron.

27. The system of claim 23, wherein said objects represent a certain television program on a certain channel at a certain time.

28. The system of claim 23, wherein said polyhedron is a cube.

29. The system of claim 28, wherein said cube further comprises three axes.

30. The system of claim 29, wherein said axes correspond to time, channel, and user preference.

31. The system of claim 23, wherein said surfaces are stationary.

32. The system of claim 23, wherein said planes correspond to levels of preference.

33. The system of claim 23, wherein one of said objects is a pictogram.

34. A machine readable medium having stored thereon sequences of instructions which are executable by a processor, and which, when executed by the processor, cause the system to perform a method for displaying an Electronic Programming Guide (EPG) comprising:

generating a three dimensional virtual mesh polyhedron wherein the virtual mesh polyhedron is displayed at an angle other than normal view;

generating a plurality of planes positioned in said polyhedron, said planes being approximately parallel, said polyhedron having a first object on a first plane and a second object on a second plane, said objects providing interactive surfaces; and further wherein said plurality of planes comprise both internal and external plane surfaces which are used to display information.

35. The machine readable medium of claim 34, wherein said EPG is displayed exclusive of three dimensional graphics circuitry.

36. The machine readable medium of claim 34, wherein the selection of one of said objects will select a program provided on a certain channel at a certain time.

37. The machine readable medium of claim 34, wherein said objects are independent of said polyhedron.

38. The machine readable medium of claim 34, wherein said objects represent a certain television program on a certain channel at a certain time.

39. The machine readable medium of claim 34, wherein said polyhedron is a cube.

40. The machine readable medium of claim 39, wherein said cube further comprises three axes.

41. The machine readable medium of claim 40, wherein said axes correspond to time, channel, and user preference.

42. The machine readable medium of claim 34, wherein said surfaces are stationary.

43. The machine readable medium of claim 34, wherein said planes correspond to levels of preference.

44. The machine readable medium of claim 34, wherein one of said objects is a pictogram.

* * * * *